US008890482B2

(12) United States Patent
Ikeuchi et al.

(10) Patent No.: US 8,890,482 B2
(45) Date of Patent: Nov. 18, 2014

(54) PROTECTION MONITORING CIRCUIT AND BATTERY PACK (75) Inventors: Akira Ikeuchi, Tokyo (JP); Yoshihide Majima, Tokyo (JP); Itsuki Nakano, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 447 days.

(21) Appl. No.: 13/143,818

(22) PCT Filed: Jan. 14, 2010

(86) PCT No.: PCT/JP2010/050360
§ 371 (c)(1),
(2), (4) Date: Jul. 8, 2011

(87) PCT Pub. No.: WO2010/082609
PCT Pub. Date: Jul. 22, 2010

(65) Prior Publication Data
US 2011/0273804 A1 Nov. 10, 2011

(30) Foreign Application Priority Data

Jan. 14, 2009  (JP) ................................ 2009-006157
Jan. 14, 2010  (JP) ................................ 2010-005980

(51) Int. Cl.
H02J 7/00 (2006.01)
H01M 10/052 (2010.01)
H01M 10/42 (2006.01)

(52) U.S. Cl.
CPC ............ *H02J 7/0031* (2013.01); *H01M 10/052* (2013.01); *H02J 2007/0037* (2013.01); *H02J 2007/0039* (2013.01); *H02J 2007/004* (2013.01); *H02J 2007/0095* (2013.01); *H01M 10/425* (2013.01)
USPC ............................ 320/134; 320/135; 320/136

(58) Field of Classification Search
USPC .................................................. 320/134–136
See application file for complete search history.

(56) References Cited

U.S. PATENT DOCUMENTS 5,530,336 A    6/1996 Eguchi et al.
6,291,965 B1   9/2001 Nagai et al.
(Continued)

FOREIGN PATENT DOCUMENTS

JP       06-105458        4/1994
JP       2000-209788      7/2000
(Continued)

OTHER PUBLICATIONS

International Search Report mailed on Apr. 13, 2010.
(Continued)

*Primary Examiner* — Samuel Berhanu
(74) *Attorney, Agent, or Firm* — IPUSA, PLLC (57) ABSTRACT A protection monitoring circuit 101 includes a protection circuit 130 which detects at least one of overcharge, overdischarge, and overcurrent of a chargeable and dischargeable secondary battery 110 and protects the secondary battery 110 by performing an ON/OFF control of transistors M11 and M12, and a secondary battery monitoring circuit 120 which detects a state of the secondary battery 110. The protection circuit 130 supplies a power supply voltage to the secondary battery monitoring circuit 120. If overdischarge of the secondary battery is detected, the protection circuit 130 inhibits the supply of the power supply voltage to the secondary battery monitoring circuit 120 after a predetermined time has elapsed or after a control signal for inhibiting the supply of power supply voltage is received from the secondary battery monitoring circuit 120.

8 Claims, 9 Drawing Sheets

(56) References Cited

U.S. PATENT DOCUMENTS

2006/0214627 A1* 9/2006 Ito et al. .................... 320/107
2009/0051324 A1  2/2009 Nakatsuji

FOREIGN PATENT DOCUMENTS

| | | |
|---|---|---|
| JP | 2001-238358 | 8/2001 |
| JP | 2001238358 * | 8/2001 |
| JP | 2006-280043 | 10/2006 |
| JP | 2008-306897 | 12/2008 |
| WO | WO 2007/119682 | 10/2007 |

OTHER PUBLICATIONS

Japanese Office Action mailed Apr. 9, 2013.

* cited by examiner

| DCNT | CCNT | COMMAND |
|---|---|---|
| 0 | 0 | OVERDISCHARGE DETECTION |
| 0 | 1 | DISCHARGE OVERCURRENT DETECTION |
| 1 | 0 | CHARGE OVERCURRENT DETECTION |
| 1 | 1 | OVERCHARGE DETECTION |

PROTECTION MONITORING CIRCUIT AND BATTERY PACK

TECHNICAL FIELD

The present disclosure relates to a protection monitoring circuit and a battery pack including a protection monitoring circuit.

BACKGROUND ART

In recent years, lithium ion batteries are installed in mobile devices, such as a digital camera and a cellular phone, as a secondary battery. Generally, lithium ion batteries are prone to overcharge, overdischarge and overcurrent, and a lithium ion battery is arranged in a form of a battery pack containing a protection circuit which detects overcharge, overcurrent and overdischarge of the battery to protect the battery from being damaged.

In a battery pack, a secondary battery monitoring circuit may be contained. This secondary battery monitoring circuit includes a temperature sensor which is arranged to detect a voltage change, corresponding to a temperature change in the battery pack, to determine a state of a lithium ion battery, such as a battery residual quantity. In this case, an additional communication terminal for transmitting an output signal from the secondary battery monitoring circuit to a mobile device is disposed in the battery pack, and the secondary battery monitoring circuit receives the signal indicating the state of the battery pack output from this communication terminal, and manages the operating state of the battery pack.

Conventionally, a charging device which receives a control signal for controlling charging of a battery pack from a communication terminal disposed in the battery pack is known. For example, refer to Patent Document 1 listed below.

Patent Document 1: Japanese Laid-Open Patent Publication No. 2000-209788

DISCLOSURE OF THE INVENTION

Problem to be Solved by the Invention

However, each of a protection circuit and a secondary battery monitoring circuit, disposed in a battery pack according to the related art, does not include a communication part for communicating with each other, each of these circuits may operate independently, and the secondary battery monitoring circuit is not provided with a unit for detecting performance of a protecting operation of the protection circuit.

Therefore, in order to determine whether the protection circuit is operated, the secondary battery monitoring circuit has to monitor the output of a voltage sensor and the output of a current sensor disposed in the secondary battery monitoring circuit.

In order to determine whether the result of the monitoring meets the condition of the protection circuit for allowing the protecting operation, it is necessary for the secondary battery monitoring circuit to continuously perform the computations.

On the other hand, when determining performance of a protecting operation by the protection circuit based on the computations of the secondary battery monitoring circuit, there are the following problems. Performance of an overcharge protecting operation by the protection circuit can be properly determined by monitoring the power supply voltage. However, performance of an overdischarge protecting operation by the protection circuit is usually determined by detection of a power-on reset operation. Specifically, at a voltage in a vicinity of an overdischarge detection voltage, supply of the power supply voltage to the secondary battery monitoring circuit is inhibited, and it is necessary to detect whether the supply of the power supply voltage to the secondary battery monitoring circuit is restarted. In this case, there is a possibility of erroneous detection, and it is difficult to accurately determine whether the protection circuit has been operated.

Also with respect to performance of an overcurrent protecting operation and performance of a short circuit protecting operation, it is very difficult to determine whether the protection circuit has been operated. The value of an overcurrent detection current of the protection circuit is out of the range of the current that can be measured by the secondary battery monitoring circuit, and the delay time up to the overcurrent detection of the protection circuit is very short. The protection circuit may operate before the secondary battery monitoring circuit completes the current measurement, and it is difficult to measure the current value.

Therefore, in order to store an accurate operating state of the protection circuit into the secondary battery monitoring circuit, it is necessary to provide a certain notification mechanism.

When overdischarge of the secondary battery is detected by the protection circuit, the protection circuit inhibits the supply of the power supply voltage to the secondary battery monitoring circuit for the purposes of preventing the secondary battery from being further discharged, and reducing the current consumption at the time of the overdischarge. Hence, even if an overdischarge state is notified, it is conceivable that the notification cannot be received by the secondary battery monitoring circuit when the supply of the power supply voltage thereto is inhibited.

Accordingly, in one aspect, the present disclosure provides a protection monitoring circuit and a battery pack including a protection monitoring circuit which are adapted to enable the secondary battery monitoring circuit to store accurate information indicating that overdischarge of the secondary battery has been detected, even when the protection circuit detects overdischarge of the secondary battery and inhibits the supply of the power supply voltage to the secondary battery monitoring circuit.

Means to Solve the Problem

In an embodiment which solves or reduces one or more of the above-mentioned problems, the present disclosure provides a protection monitoring circuit including: a protection circuit which detects at least one of overcharge, overdischarge, and overcurrent of a chargeable and dischargeable secondary battery and protects the secondary battery by performing an ON/OFF control of transistors; and a secondary battery monitoring circuit which detects a state of the secondary battery, wherein the protection circuit is configured to supply a power supply voltage to the secondary battery monitoring circuit, and further configured to inhibit, if overdischarge of the secondary battery is detected, the supply of the power supply voltage to the secondary battery monitoring circuit after a predetermined time has elapsed or after a control signal for inhibiting the supply of the power supply voltage is received from the secondary battery monitoring circuit.

Effect of the Invention

According to the present disclosure, it is possible to provide a protection monitoring circuit and a battery pack which allows the secondary battery monitoring circuit to store accurate information indicating that overdischarge of the secondary battery has been detected, even when the protection circuit detects overdischarge of the secondary battery and inhibits the supply of the power supply voltage to the secondary battery monitoring circuit.

BEST MODE FOR CARRYING OUT THE INVENTION

A description will be given of embodiments of the present disclosure with reference to the accompanying drawings.
<Internal Composition of Battery Pack>

Figure 1:
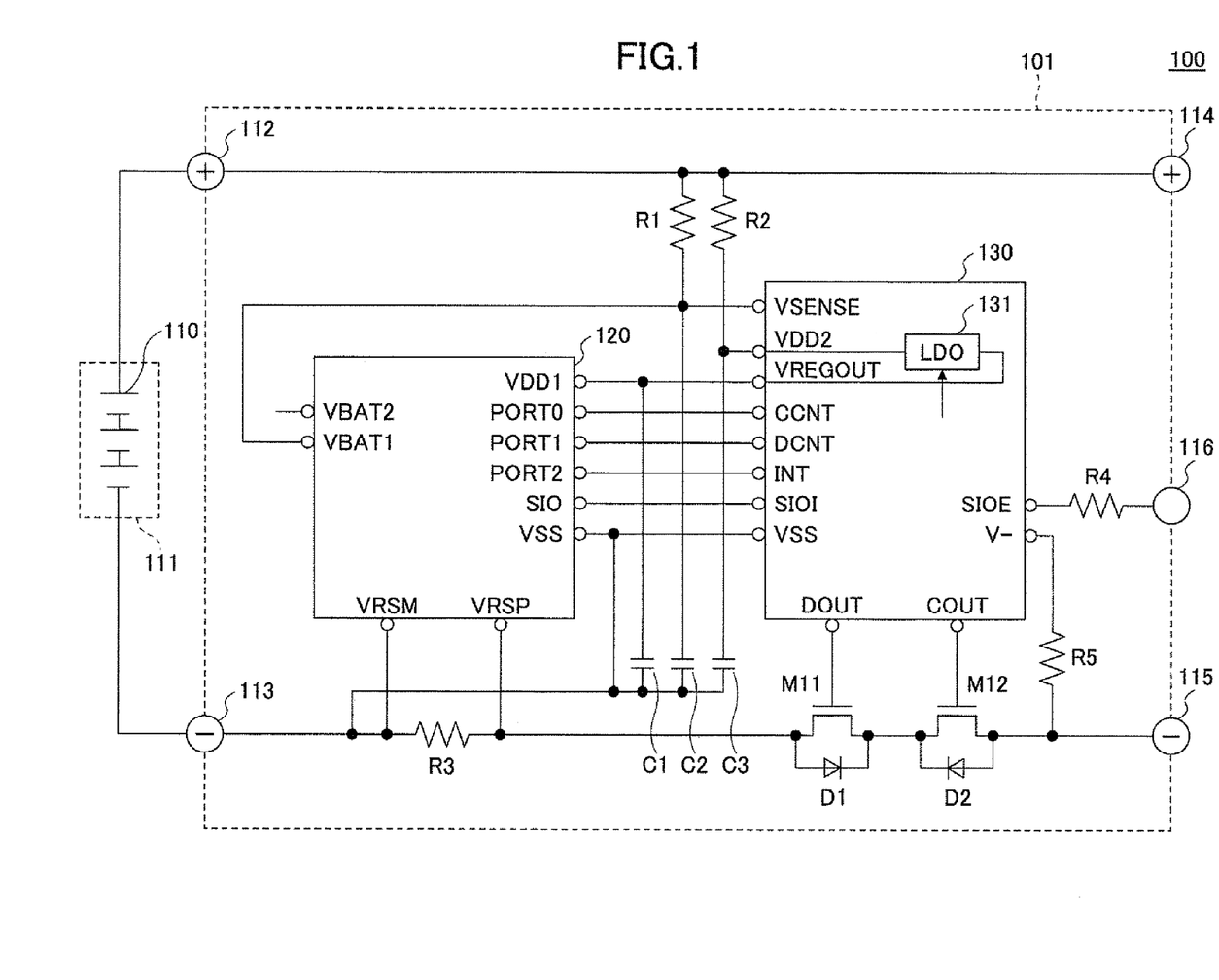
FIG. 1 is a diagram showing the internal composition of a battery pack including a protection monitoring circuit of an embodiment of the present disclosure.

FIG. 1 shows the internal composition of a battery pack of an embodiment of the present disclosure.

As shown in FIG. 1, the battery pack 100 is constructed to include a protection monitoring circuit 101 and a battery unit 111. The protection monitoring circuit 101 and the battery unit 111 are connected together by a secondary battery positive terminal 112 and a secondary battery negative terminal 113.

The protection monitoring circuit 101 includes a secondary battery monitoring IC 120, a protection IC 130, resistors R1-R5, capacitors C1-C3, a MOS (metal oxide semiconductor) transistor M11 having a parasitism diode D1, a MOS transistor M12 having a parasitism diode D2, a positive terminal 114, a negative terminal 115, and an external terminal 116 which are disposed on a single substrate and constructed into a protection module or a COB (chip on board) module. The secondary battery monitoring circuit and the protection circuit may be constructed by an IC (integrated circuit), or may be provided in the form of, for example, an IC package or a COB module.

The battery pack 100 is connected to a mobile device, a charging device, etc. by the positive terminal 114 and the negative terminal 115. The battery pack 100 monitors a state of a battery unit 111 which includes two or more secondary batteries 110, by using the secondary battery monitoring IC 120, and protects the battery unit 111 from overcharge, overcurrent, overdischarge, etc. by using the protection IC 130.
<Secondary Battery Monitoring Circuit>

Next, the secondary battery monitoring IC 120 shown in FIG. 1 will be described.

The secondary battery monitoring IC 120 monitors a state of the battery unit 111, acquires the state information of the battery unit 111, and detects a residual quantity of the battery and other information. The secondary battery monitoring IC 120 sends the acquired state information to the mobile device when a request for accessing the state information is received from the mobile device. For example, the product name MM8002 is attached to the secondary battery monitoring IC 120.

The secondary battery monitoring IC 120 is constructed to include a VDD1 terminal which is a power-supply terminal, a VSS terminal which is a reference potential terminal, a VBAT1 terminal which is a voltage detection terminal of the battery unit 111, a VRSP terminal and a VRSM terminal which are a set of voltage detection terminals to detect a voltage between the ends of a resistor R3, an SIO terminal which is a communication terminal with the mobile device, a PORT0 terminal which is a communication terminal with the protection IC 130, a PORT1 terminal, and a PORT2 terminal.

The power supply voltage from the protection IC 130 is regulated (stabilized) and the regulated power supply voltage is supplied to the secondary battery monitoring IC 120 via the VDD1 terminal which is the power-supply terminal. The value of the power supply voltage supplied from the protection IC 130 is set to a voltage value which is lower than a predetermined value of the power supply voltage of the battery unit 111 which is detected as overdischarge of the battery. The secondary battery monitoring IC 120 is controlled to operate appropriately under the value of the power supply voltage which is set up in this way.

The secondary battery monitoring IC 120 detects a power supply voltage of the battery unit 111 through the VBAT1 terminal which is the voltage detection terminal connected to the position terminal of the battery unit 111. The VRSM and VRSP terminals which are the set of voltage detection terminals are to detect the voltage between the ends of the resistor R3 which is disposed outside the secondary battery monitoring IC 120, and thereby detecting the current flowing through the resistor R3. Hence, the secondary battery monitoring IC 120 detects the charging/discharge current of the battery unit 111.

The SIO terminal of the secondary battery monitoring IC 120 is connected through the protection IC 130 to the external terminal 116 which is used for communication with the mobile device. The secondary battery monitoring IC 120 performs communication with the mobile device through the SIO terminal (which is the communication terminal) and the protection IC 130. The secondary battery monitoring IC 120 performs communication with the protection IC 130 through the PORT0 terminal, the PORT1 terminal, and the PORT2 terminal, which are the communication terminals connected to the protection IC 130. Specifically, when at least one of overcharge, overcurrent, and overdischarge of the battery unit 111 is detected by the protection IC 130, the secondary battery monitoring IC 120 receives, from the protection IC 130, a notification signal indicating that the at least one of overcharge, overcurrent, and overdischarge of the battery unit 111 has been detected.

The secondary battery monitoring IC 120 stores the information indicating the detection of the at least of overcharge, overcurrent, and overdischarge of the battery unit 111 into a nonvolatile memory, after the notification signal indicating that the at least one of overcharge, overcurrent and overdischarge of the battery unit 111 has been detected is received from the protection IC 130.

When a notification signal indicating that overdischarge of the battery unit 111 has been detected is received, the secondary battery monitoring IC 120 is caused to perform an interrupt process to store the information indicating that the overdischarge is detected into the nonvolatile memory. Moreover, after the information is stored, the operation (function) of the secondary battery monitoring IC 120 is stopped, and the secondary battery monitoring IC 120 is set in a waiting condition for an OFF state (shutdown) of the voltage regulator (LDO) 131 of the protection IC 130 which will be described later. Furthermore, the secondary battery monitoring IC 120 is configured to output a control signal for turning off the voltage regulator 131 to the protection IC 130, immediately before stopping the operation of the secondary battery monitoring IC 120.

<Protection Circuit>

Next, the protection IC 130 shown in FIG. 1 will be described.

The protection IC 130 includes an overcharge detection circuit, an overcurrent detection circuit, and an overdischarge detection circuit which are built in the protection IC 130, and detects overcharge, overcurrent, and overdischarge of the battery unit 111, to protect the battery unit 111 from overcharge, overcurrent, and overdischarge. For example, the product name MM3289 is attached to the protection IC 130.

The protection IC 130 is constructed to include a VDD2 terminal which is a power-supply terminal, a VSS terminal which is a reference potential terminal, a VSENSE terminal which is a voltage detection terminal, and a VREGOUT terminal which is a terminal which outputs the regulated voltage to the secondary battery monitoring IC 120.

The protection IC 130 is constructed to include a DOUT terminal, a COUT terminal, a CCNT terminal, a DCNT terminal, and an INT terminal. The DOUT and COUNT terminals are respectively connected to the gates of the MOS transistors M11 and M12 which are used to inhibit the charging and discharging of the battery pack 100. The CCNT, DCNT and INT terminals are communication terminals with the secondary battery monitoring IC 120.

The power supply voltage is supplied to the protection IC 130 through the VDD2 terminal which is the power-supply terminal connected to the position terminal of the battery unit 111. The VSS terminal which is the reference potential terminal is connected to the negative electrode of the battery unit 111.

The protection IC 130 includes a voltage regulator (LDO) 131 which performs a low saturation regulation. The power supply voltage supplied to the VDD2 terminal is regulated by the voltage regulator 131, and the regulated power supply voltage is supplied to the secondary battery monitoring IC 120 via the VREGOUT terminal. The value of the power supply voltage (the output voltage of the voltage regulator 131) which is regulated by the voltage regulator 131 and supplied to the secondary battery monitoring IC 120 is set up to be lower than a predetermined value of the power supply voltage of the battery unit 111 that is detected as overdischarge. The secondary battery monitoring IC 120 is controlled to operate appropriately under the value of the power supply voltage which is set up in this way.

When the value of the power supply voltage of the battery unit 111 is lowered, such as in a case where overdischarge of the battery unit 111 is detected, the value of the power supply voltage supplied to the secondary battery monitoring IC 120 is also lowered. Hence, if the value of the power supply voltage for the secondary battery monitoring IC 120 to operate normally is set up to be higher than the predetermined value of the power supply voltage and overdischarge of the battery unit 111 is detected, then the power supply voltage for the secondary battery monitoring IC 120 to operate normally is not supplied. In this case, the operating state of the secondary battery monitoring IC 120 may be unstable. Although the secondary battery monitoring IC 120 has the function of monitoring the state of the power supply voltage of the battery unit 111, the state of the battery unit 111 cannot be accurately detected by the secondary battery monitoring IC 120 which is in the unstable operating state.

However, in this embodiment, the value of the regulated power supply voltage being supplied to the secondary battery monitoring IC 120 is set up to be lower than the predetermined value of the power supply voltage of the battery unit 111 that is detected as overdischarge. Hence, the secondary battery monitoring IC 120 is controlled to operate appropriately.

When the value of the regulated power supply voltage being supplied to the secondary battery monitoring IC 120 is lowered due to lowering of the power supply voltage of the battery unit 111, overdischarge of the battery unit 111 is first detected, and the supply of the power supply voltage to the secondary battery monitoring IC 120 is inhibited as described above. Hence, even if the power supply voltage of the battery unit 111 is lowered to a value in the vicinity of the overdischarge detection voltage of the protection IC 130, it is possible to prevent the power supply voltage supplied to the secondary battery monitoring IC 120 from being lowered. Therefore, the secondary battery monitoring IC 120 can normally store the log information of the state of the battery unit 111 before overdischarge of the battery unit 111 is detected.

In this embodiment, the voltage regulator 131 and the protection IC 130 are arranged in a unitary structure and integrated on the substrate. The present disclosure is not limited to this embodiment. Alternatively, the voltage regulator 131 and the protection IC 130 may be arranged separately on different substrates.

The protection IC 130 detects a power supply voltage of the battery unit 111 through the VSENSE terminal which is the voltage detection terminal connected to the position terminal of the battery unit 111. The VSENSE terminal is used to detect overcharge of the battery unit 111 and to input a voltage to the overdischarge detection circuit. When overdischarge or overcurrent of the battery unit 111 is detected, the protection IC 130 turns off the MOS transistor M11 by setting the output of the DOUT terminal to a low level. When overcharge or charge overcurrent of the battery unit 111 is detected, the protection IC 130 turns off the MOS transistor M12 by setting the output of the COOT terminal to a low level.

The protection IC 130 performs communication with the secondary battery monitoring IC 120 through the CCNT terminal, the DCNT terminal and the INT terminal, which are the communication terminals connected to the secondary battery monitoring IC 120. Specifically, when one of overcharge, overcurrent, and overdischarge of the battery unit 111 is detected, the protection IC 130 outputs a notification signal indicating that the one of overcharge, overcurrent, and overdischarge of the battery unit 111 is detected, to the secondary battery monitoring IC 120.

When overdischarge of the battery unit 111 is detected, the protection IC 130 turns off the voltage regulator 131 (shutdown) after a predetermined time has elapsed from the time of detection of the battery overdischarge or after a control signal for turning off the voltage regulator 131 (or a voltage regulator OFF signal) is received from the secondary battery monitoring IC 120, and inhibits supply of the power supply voltage to the secondary battery monitoring IC 120. At the same time, the protection IC 130 is shifted to a shutdown mode.

After the protection IC 130 is shut down at the time of detection of the battery overdischarge, charging of the secondary battery 111 is restarted. When a predetermined voltage of the secondary battery 111 by the charging is reached, the protection IC 130 determines that the secondary battery 111 is returned to the normal state from the overdischarge state, and turns on the voltage regulator 131.

<Hardware Composition of Secondary Battery Monitoring Circuit>

Figure 2:
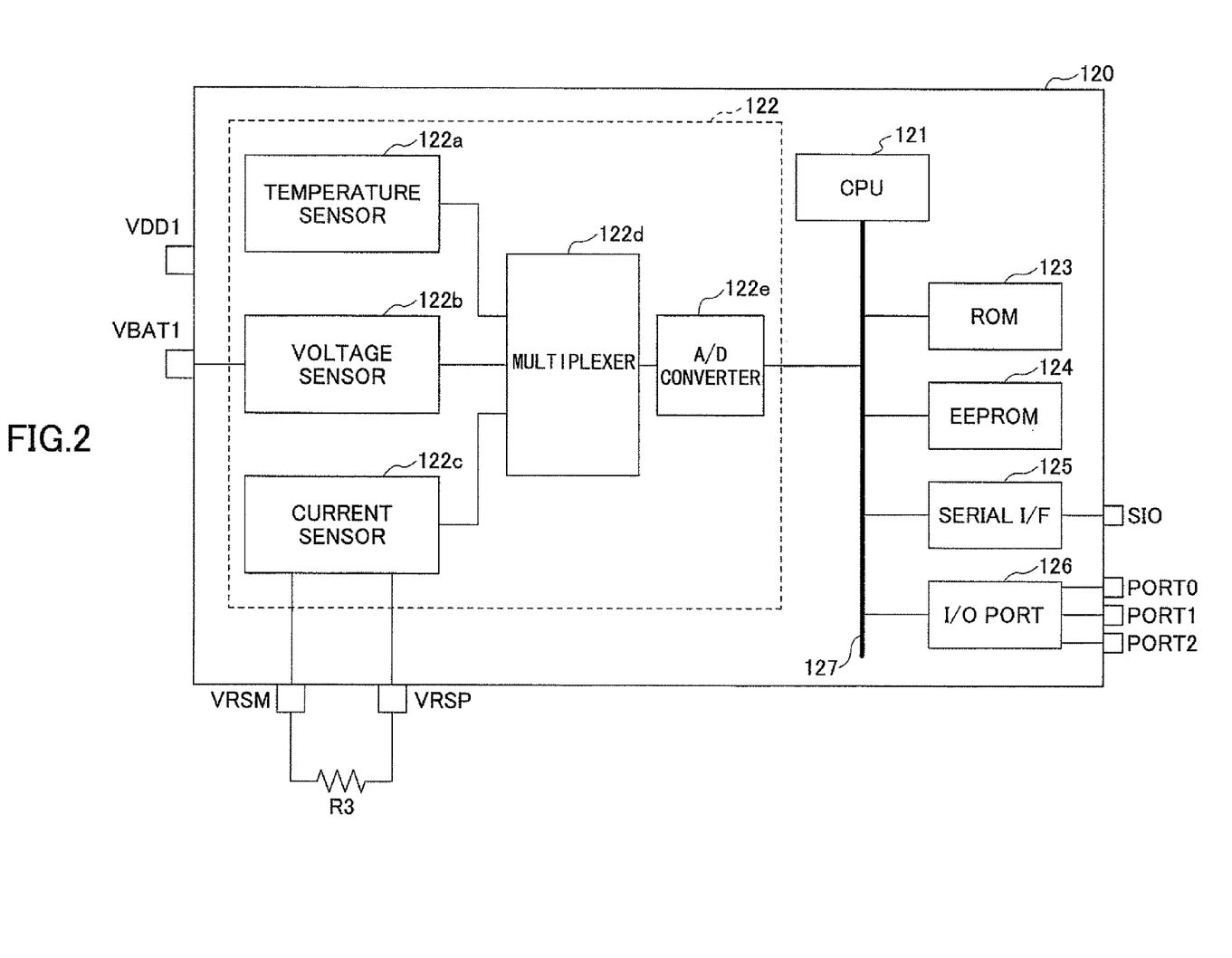
FIG. 2 is a diagram showing the hardware composition of a secondary battery monitoring IC.

Next, the composition of a secondary battery monitoring IC of this embodiment will be described with reference to FIG. 2. FIG. 2 shows the hardware composition of the secondary battery monitoring IC 120 of this embodiment.

As shown in FIG. 2, the secondary battery monitoring IC 120 is constructed to include a CPU (central processing unit) 121, a sensor part 122, a ROM (read only memory) 123, an EEPROM (electronically erasable and programmable ROM) 124, a serial interface (I/F) 125, and an input/output port (I/O port) 126.

The CPU 121 controls respective parts of the secondary battery monitoring IC 120. The sensor part 122 detects a voltage, a current, and a temperature of the battery unit 111. The ROM 123 stores a program executed by the CPU 121 to control the respective parts of the secondary battery monitoring IC 120.

The CPU 121 generates a control signal sent to the protection IC 130, and outputs the generated control signal to the protection IC 130 via the input/output port 126 from PORT0, PORT1, and PORT2 terminals which are connected to the protection IC 130.

Specifically, when a notification signal indicating that the battery overdischarge is detected by the protection IC 130 is received from the PORT0, PORT1 and PORT2 terminals, the CPU 121 performs an interrupt process to store the information indicating that the overdischarge is detected by the protection IC 130 into the nonvolatile memory, such as the EEPROM 124 or the like.

At this time, the CPU 121 stores the information indicating that the overdischarge is detected. Immediately before stopping the operation (function) of the secondary battery monitoring IC 120, the CPU 121 generates a voltage regulator OFF signal which is a control signal for turning off the voltage regulator 131 of the protection IC 130, and outputs the generated signal to the protection IC 130 via the PORT0, PORT1 and PORT2 terminals.

For example, when the information indicating the detection of the battery overdischarge is stored in the EEPROM 124, the CPU 121 increments the number of times of detection by using a register, etc. to count the number of times of detection and stores the counted number of times of detection in the EEPROM 124.

The EEPROM 124 stores information including respective parameters of the voltage, the current and the temperature, etc. of the battery unit 111 detected by the sensor part 122. The EEPROM 124 further stores the information indicating that one of overcharge, overcurrent and overdischarge of the battery unit 111 is detected, which information is received via the input/output port 126 from the PORT0, PORT1 and PORT2 terminals which are the three communication terminals.

The input/output port 126 is used to send or receive the signal for communicating with the protection IC 130, through the PORT0, PORT1 and PORT2 terminals which are the three communication terminals.

The CPU 121, the sensor part 122, the ROM 123, the EEPROM 124, the serial I/F 125, and the input/output port 126 are interconnected by a bus 127 and data and programs can be exchanged between these components.

The sensor part 122 is constructed to include a temperature sensor circuit 122*a*, a voltage sensor circuit 122*b*, a current sensor circuit 122*c*, a multiplexer 122*d*, and an analog-to-digital (A/D) converter 122*e*.

The temperature sensor circuit 122*a* detects a temperature of the battery unit 111. The voltage sensor circuit 122*b* detects an output voltage of the battery unit 111 via a voltage detection terminal VBAT1 which is connected to the battery unit 111. The current sensor circuit 122*c* detects a current which flows through an external resistor R3, i.e., the charging and discharging current of the battery unit 111, via voltage detection terminals VRSP and VRSM which are connected to the ends of the external resistor R3.

The outputs of the temperature sensor circuit 122*a*, the voltage sensor circuit 122*b* and the current sensor circuit 122*c* are connected to the multiplexer 122*d*, and the multiplexer 122*d* outputs a single output signal. The A/D converter 122*e* converts the analog signal output from the multiplexer 122*d* into digital data.

<Internal Composition of Protection IC>

Figure 3:
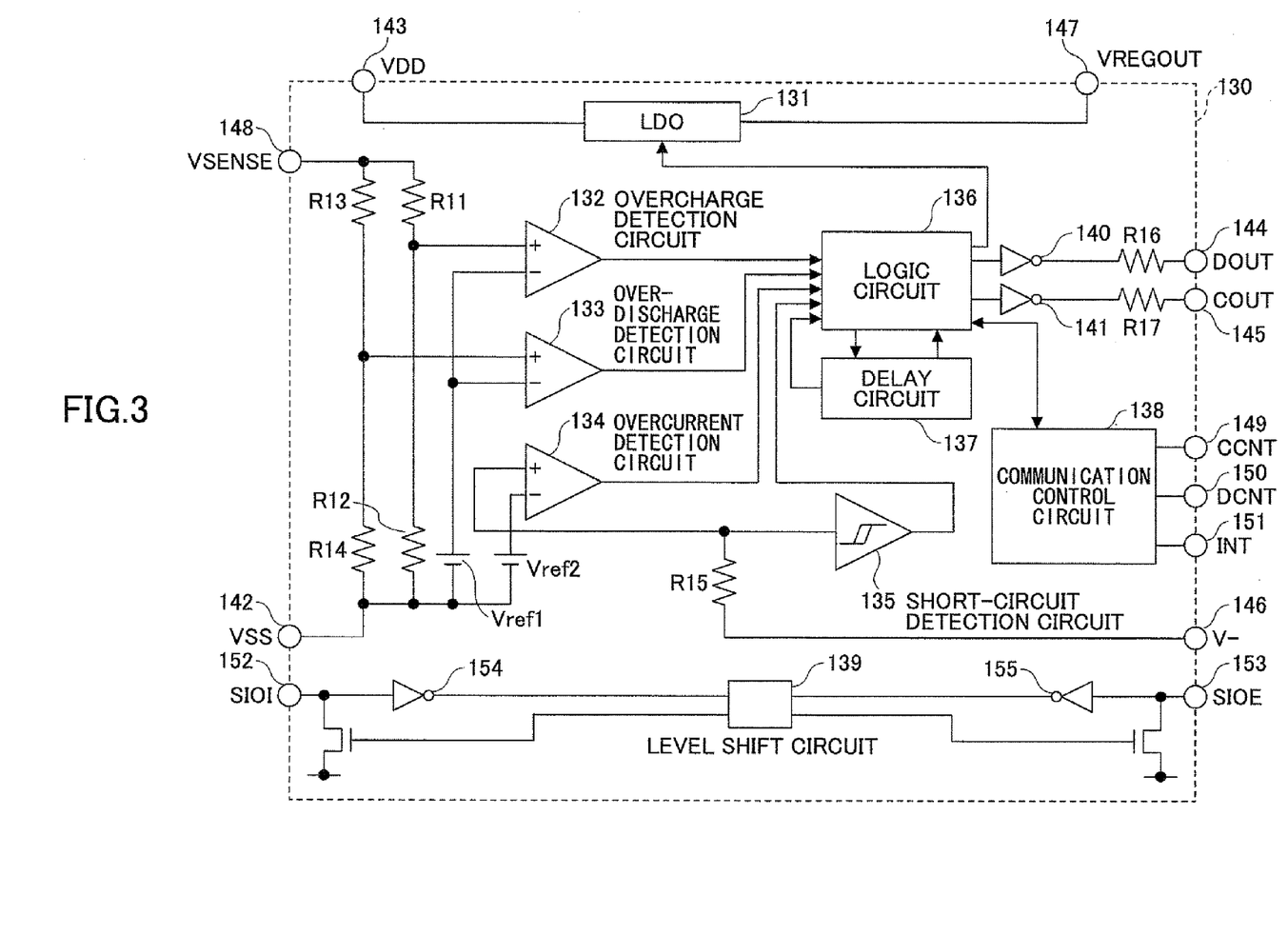
FIG. 3 is a diagram showing the internal composition of a protection IC.

Next, the internal composition of a protection IC of this embodiment will be described with reference to FIG. 3. FIG. 3 shows the internal composition of the protection IC 130 of this embodiment.

As shown in FIG. 3, the protection IC 130 is constructed to include a voltage regulator (LDO) 131, an overcharge detection circuit 132, an overdischarge detection circuit 133, an overcurrent detection circuit 134, and a short-circuit detection circuit 135.

The protection IC 130 is constructed to include a logic circuit 136, a delay circuit 137, and a communication control circuit 138. The logic circuit 136 generates a control signal based on a detection signal received from each of the above detection circuits and outputs the control signal. The delay circuit 137 is a non-sensitive time setting circuit. The communication control circuit 138 controls the bidirectional communication between the protection IC 130 and the secondary battery monitoring IC 120.

As shown in FIG. 3, the protection IC 130 is constructed to include a VSS terminal 142, a VDD terminal 143, a DOUT terminal 144, a COUT terminal 145, a V-(minus) input terminal 146, a VREGOUT terminal 147, a VSENSE terminal 148, a CCNT terminal 149, a DCNT terminal 150, and an INT terminal 151.

The voltage regulator 131 is connected to the VDD terminal 143 (the VDD2 terminal shown in FIG. 1) which is a power-supply terminal, and carries out the regulation of the power supply voltage being supplied to the protection IC 130. The voltage regulator 131 is connected to the VREGOUT terminal 147, regulates the power supply voltage, and outputs the regulated power supply voltage from the VREGOUT terminal 147 to the secondary battery monitoring IC 120.

The overcharge detection circuit 132 includes a comparator. In the overcharge detection circuit 132, the non-inverted input terminal is connected to a junction point between the resistors R11 and R12 which are connected in series between the VSS terminal 142 and the VSENSE terminal 148, and the inverted input terminal is connected to the positive electrode side of a reference voltage source Vref1.

The overdischarge detection circuit 133 includes a comparator similar to the overcharge detection circuit 132. In the overdischarge detection circuit 133, the non-inverted input terminal is connected to a junction point between the resistors R13 and R14 which are connected in series between the VSS terminal 142 and the VSENSE terminal 148. The inverted input terminal of the overdischarge detection circuit 133 is connected to the positive electrode side of the reference voltage source Vref1.

The overcurrent detection circuit 134 includes a comparator similar to the overcharge detection circuit 132 or the overdischarge detection circuit 133. In the overcurrent detection circuit 134, the non-inverted input terminal is connected to the V-input terminal 146 via the resistor R15, and the inverted input terminal is connected to the positive electrode side of a reference voltage source Vref2. The negative electrode side of each of the reference voltage sources Vref1 and Vref2 is connected to the VSS terminal 142.

The short-circuit detection circuit 135 includes an amplifier with a hysteresis function, and is connected to the V– input terminal 146 via the resistor R15.

The overcharge detection circuit 132 outputs an overcharge detection signal when an overcharge state of the secondary battery is detected. The overdischarge detection circuit 133 outputs an overdischarge detection signal when an overdischarge state of the secondary battery is detected, and outputs an overdischarge return signal when an overdischarge recovery of the secondary battery is detected. The overcurrent detection circuit 134 outputs an overcurrent detection signal when an overcurrent of the secondary battery is detected.

Outputting any one of the overcharge detection signal, the overdischarge detection signal and the overcurrent detection signal is maintained while a corresponding one of the overcharge state, the overdischarge state and the overcurrent state of the secondary battery is continued, and each corresponding detection signal is input to the logic circuit 136. When the corresponding one of the overcharge detection signal, the overdischarge detection signal and the overcurrent detection signal is input to the logic circuit 136, the logic circuit 136 outputs a signal according to each corresponding state to the delay circuit 137.

The delay circuit 137 outputs a first overdischarge designation signal to the logic circuit 136 when the signal corresponding to the overdischarge detection signal is received from the logic circuit 136 and a first-step non-sensitive time which is predetermined for the overdischarge detection signal has elapsed. Further, the logic circuit 136 outputs a second overdischarge designation signal to the logic circuit 136 when a predetermined second-step non-sensitive time has elapsed.

The logic circuit 136 outputs a discharge control signal for cutting off the discharging current to the DOUT terminal 144 via the inverter 140 and the resistor R16 when the first overdischarge designation signal described above is received. Further, the logic circuit 136 outputs a voltage-regulator OFF signal for turning off the voltage regulator 131 to the voltage regulator 131 when the second overdischarge designation signal described above is received.

The delay circuit 137 outputs an overcurrent designation signal to the logic circuit 136 when the signal corresponding to the overcurrent detection signal is received from the logic circuit 136 and a non-sensitive time which is predetermined for the overcurrent detection signal has elapsed. When the overcurrent designation signal is received, the logic circuit 136 outputs a discharge control signal for cutting off the discharging current to the DOUT terminal 144.

The logic circuit 136 outputs a discharge control signal for cutting off the discharging current to the DOUT terminal 144, without non-sensitive time, when a short-circuit detection signal is received from the short-circuit detection circuit 135.

The logic circuit 136 outputs a voltage regulator ON signal for turning on the voltage regulator 131 to the voltage regulator 131, without non-sensitive time, when an overdischarge return signal is received from the overdischarge detection circuit 133.

The delay circuit 137 outputs an overcharge designation signal to the logic circuit 136 when the signal corresponding to the overcharge detection signal is received from the logic circuit 136 and a non-sensitive time which is predetermined for the overcharge detection signal has elapsed. When the overcharge designation signal is received, the logic circuit 136 outputs a charge control signal for cutting off the charging current to the COUT terminal 145 via the inverter 141 and the resistor R17.

When a voltage regulator OFF signal for turning off the voltage regulator 131 is received from the secondary battery monitoring IC 120 via one of the CCNT terminal 149, the DCNT terminal 150 and the INT terminal 151, the communication control circuit 138 outputs a notification signal indicating the shutdown of the voltage regulator 131 to the logic circuit 136. The logic circuit 136 outputs a voltage regulator OFF signal to the voltage regulator 131 in response to the notification signal indicating the shutdown of the voltage regulator 131 and received from the communication control circuit 138.

When a corresponding one of the overcharge detection signal, the overdischarge detection signal and the overcurrent detection signal is received at the logic circuit 136 as described above, the communication control circuit 138 outputs the corresponding one of the overcharge detection signal, the overdischarge detection signal and the overcurrent detection signal to the secondary battery monitoring IC 120 via a corresponding one of the CCNT terminal 149, the DCNT terminal 150 and the INT terminal 151.

The protection IC 130 is constructed to include an S100 terminal 152 connected to the secondary battery monitoring IC 120, a level shift circuit 139 to perform the level shifting of the communication pulse signal output from the S100 terminal 152, and an SIOE terminal 153 connected to the external terminal 116 for performing communication with a mobile device, etc. The level shift circuit 139 shifts the level of the communication pulse signal indicating the state information and received from the S100 terminal 152, and outputs the resulting signal.

The SIOI terminal 152 and the SIOE terminal 153 are used to merely pass through the communication signal transmitted between the mobile device and the secondary battery monitoring IC 120. Specifically, if the voltage of one of these terminals is set to a low level, the low-level voltage signal is output to the other terminal. The same operation is performed for each of the bidirectional communication signals.

The secondary battery monitoring IC 120 is fabricated using a precision IC manufacture process of a microcomputer-incorporated semiconductor device (which is prone to static electricity), while the protection IC 130 is fabricated using an IC manufacturing process and has good resistance against static electricity and high voltage. The communication terminals used to communicate with a mobile device are also used as terminals of battery packs. It is necessary that the communication terminals meet the requirements of the safety standards of battery packs and have good resistance against static electricity and high voltage. However, if the communication terminals of the secondary battery monitoring IC 120 are used without changes, it is difficult for the communication terminals to meet the requirements for static electricity. Hence, the communication signal received from the mobile device is temporarily received at the protection IC 130 and output from the protection IC 130 to the secondary battery monitoring IC 120, and the communication terminals of the protection IC 130 have the protection IC 130 against static electricity and high voltage.

Next, with reference to FIGS. 4, 5 and 6, some examples of operation at the time of the communication from the protection IC 130 to the secondary battery monitoring IC 120 will be described.

Figure 4:
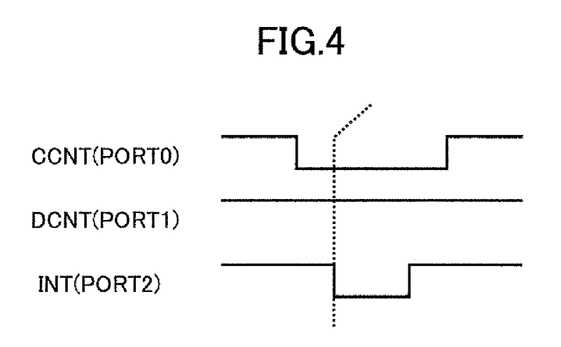
FIG. 4 is a diagram for explaining the operation at a time of the communication from the protection IC to the secondary battery monitoring IC when a state of the secondary battery other than overdischarge is detected.

FIG. 4 is a diagram for explaining the operation at the time of the communication from the protection IC to the secondary battery monitoring IC when an undesired state of the secondary battery other than overdischarge is detected. In the case of FIG. 4, the logic of CCNT (PORT0) and DCNT (PORT1) denotes the state of these terminals when a charge overcurrent state of the secondary battery is detected. FIG. 5 is a diagram for explaining the operation at the time of the communication from the protection IC to the secondary battery monitoring IC when an overdischarge state of the secondary battery is detected. FIG. 6 shows a list of the commands recognized in the secondary battery monitoring IC.

The operation performed by the protection IC 130 in the case of detection of the battery overdischarge is different from that in the cases of detection of the battery overcharge and overcurrent other than the battery overdischarge. Specifically, in the cases of detection of the battery overcharge, discharge overcurrent and charge overcurrent, other than the battery overdischarge, the protection IC 130 sets the CCNT terminal and the DCNT terminal according to the command list of FIG. 6 and outputs a pulse signal to the INT terminal.

As shown in FIG. 4, when overcharge of the secondary battery is detected, the protection IC 130 sets the CCNT (PORT0) terminal to a low level (0), sets the DCNT (PORT1) terminal to a high level (1), and thereafter outputs a pulse signal with a low level to the INT (PORT1) terminal for a fixed time. Subsequently, the protection IC 130 sets the CCNT (PORT0) terminal in an open state (high level).

The secondary battery monitoring IC 120 receives a falling edge of the pulse signal from the INT terminal as a trigger, and latches the CCNT terminal and the DCNT terminal. For example, the pulse width of the signal from the INT terminal is set to MIN=100 microseconds, in order to ensure the latching at 38.4 kHz.

Figure 5:
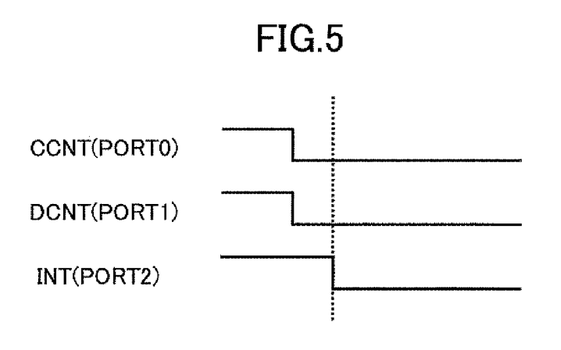
FIG. 5 is a diagram for explaining the operation at a time of the communication from the protection IC to the secondary battery monitoring IC when overdischarge of the secondary battery is detected.

As shown in FIG. 5, when overdischarge of the secondary battery is detected, the protection IC 130 sets the CCNT (PORT0) terminal to a low level, sets the DCNT (PORT1) terminal to a low level, and pulls down the INT (PORT1) terminal (or sets the INT (PORT1) terminal to a low level and holds the same).

Figure 6:
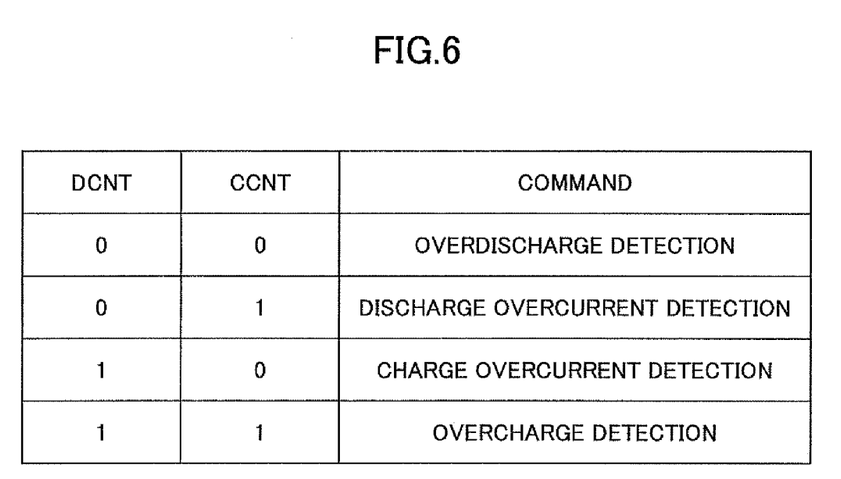
FIG. 6 is a diagram showing a list of commands recognized by the secondary battery monitoring IC.

As shown in FIG. 6, in the case of DCNT=0 and CCNT=0, the protection IC 130 notifies a command of overdischarge detection to the secondary battery monitoring IC 120. In the case of DCNT=0 and CCNT=1, the protection IC 130 notifies a command of discharge overcurrent detection to the secondary battery monitoring IC 120. In the case of DCNT=1 and CCNT=0, the protection IC 130 notifies a command of charge overcurrent detection to the secondary battery monitoring IC 120. In the case of DCNT=1 and CCNT=1, the protection IC 130 notifies a command of overcharge detection to the secondary battery monitoring IC 120.

After overdischarge of the secondary battery is detected and the DOUT terminal is set to the low level, the protection IC 130 maintains the INT (PORT2) terminal at the low level, turns off the voltage regulator 131 that supplies the voltage to the secondary battery monitoring IC 120, and thereafter sets the INT (PORT2) terminal in a HiZ (high-impedance) state. Because the voltage regulator 131 is turned off, the output signal is apparently kept at the low level.

As described above, the protection IC 130 is arranged to perform an interrupt process to notify the secondary battery monitoring IC 120 of the information indicating that one of overcharge, overdischarge, charge overcurrent, discharge overcurrent, etc. of the secondary battery is detected.

Figure 7:
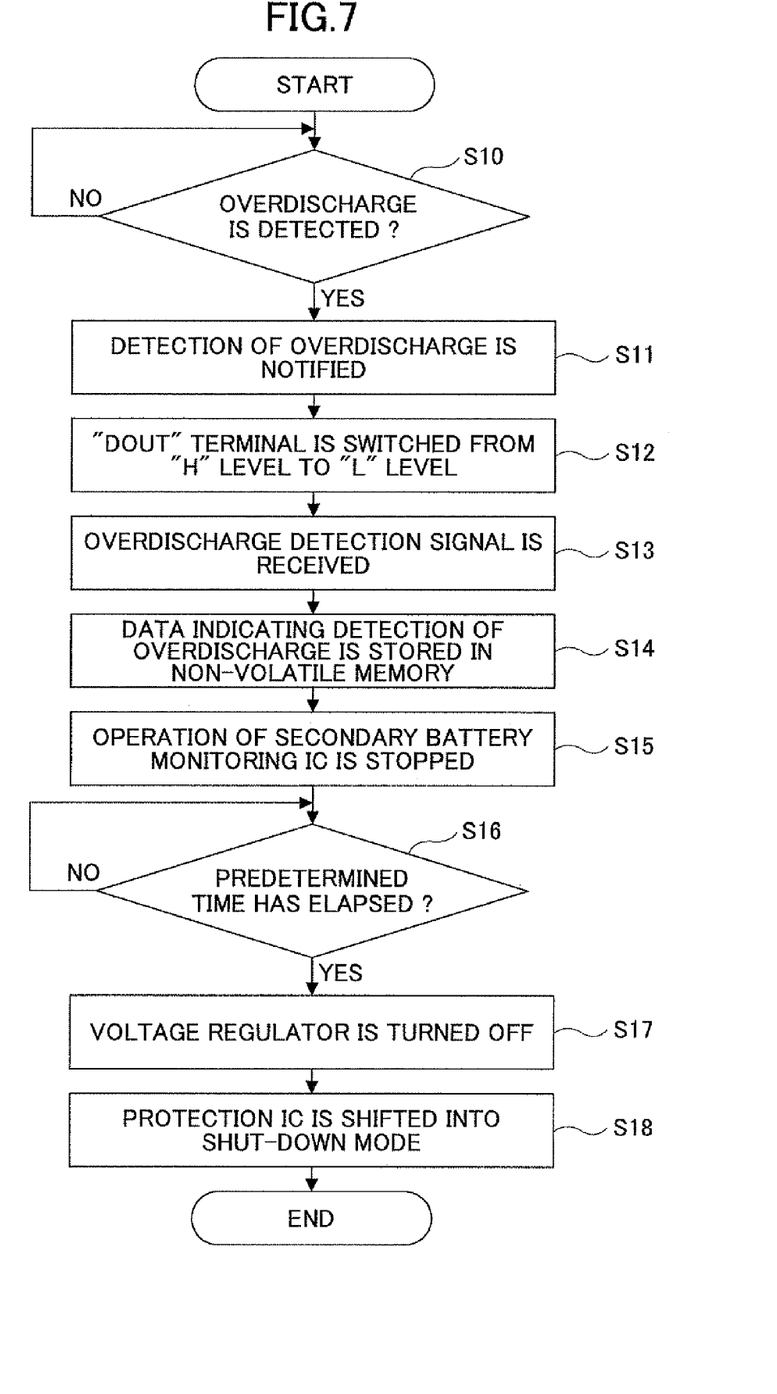
FIG. 7 is a flowchart for explaining an operation process of the protection IC and the secondary battery monitoring IC of an embodiment of the present disclosure when overdischarge of the battery is detected by the protection IC.

Next, with reference to FIG. 7, an operation process of the protection IC 130 and the secondary battery monitoring IC 120 of an embodiment of the present disclosure when overdischarge of the secondary battery is detected by the protection IC 130 will be described. FIG. 7 is a flowchart for explaining the operation process of the protection IC and the secondary battery monitoring IC of this embodiment at the time of detection of the battery overdischarge by the protection IC.

As shown in FIG. 7, the protection IC 130 determines whether overdischarge of the secondary battery is detected (S10).

When it is determined in the step S10 that overdischarge of the secondary battery is detected, the protection IC 130 notifies the secondary battery monitoring IC 120 of the detection of the battery overdischarge by performing the operation as shown in FIG. 5 (S11).

In order to control the battery discharging, the protection IC 130 starts counting of clock pulses after a time the battery overdischarge has been detected at the step S10, and after the first-step non-sensitive time (for example, about 24 ms) has elapsed, the protection IC 130 switches the DOUT terminal from a high level to a low level (S12). At this time, the protection IC 130 shifts the protection function part of the protection IC 130, other than the voltage regulator 131, to a low power state.

When it is determined in the step S10 that the battery overdischarge is not detected, the protection IC 130 continues the determination processing until overdischarge of the secondary battery is detected.

Subsequently, the secondary battery monitoring IC 120 receives an interrupt signal at the INT terminal produced by the protection IC 130 at the step S11 and receives the overdischarge detection signal from the protection IC 130 (S13). For example, when the secondary battery monitoring IC 120 is in a sub-clock mode at this time, the secondary battery monitoring IC 120 performs an interrupt process to restart the PLL (phase locked loop) in order to perform the following step S14.

The secondary battery monitoring IC 120 stores the information indicating that the battery overdischarge is detected by the protection IC 130, into the nonvolatile memory, such as the EEPROM 124 (S14).

Subsequently, the secondary battery monitoring IC 120 stops the operation (S15) and is set in a waiting condition for an OFF state (shutdown) of the voltage regulator 131 of the protection IC 130.

It is preferred that the above steps S13 to S15 are processed by the secondary battery monitoring IC 120 until the voltage regulator 131 is shut down, for example, about 40 ms after the detection of the battery overdischarge by the protection IC 130 at the step S10.

The protection IC 130 determines whether a predetermined delay time after the detection of the battery overdischarge at the step S10 up to the OFF state of the voltage regulator (or the second-step non-sensitive time described above which is, for example, about 64 ms) has elapsed (S16).

When it is determined in the step S16 that the predetermined delay time has elapsed, the protection IC 130 shuts down the voltage regulator 131 (S17). This enables the current consumption of the secondary battery monitoring IC 120 to be reduced.

When it is determined in the step S16 that the predetermined delay time has not elapsed, the protection IC 130 continues the counting of clock pulses.

As described above, the protection IC 130 is arranged to have a two-step timer function which includes the first count value from the detection of the battery overdischarge to the switching of the DOUT terminal from the high level to the low level, and the second count value from the detection of the battery overdischarge to the shutdown of the voltage regulator 131.

Subsequently, using the control signal for shutting down the voltage regulator 131, the protection IC 130 is shifted to the standby mode and further shifted to the shutdown mode, in order to reduce the current consumption of the protection IC 130 as much as possible (S18).

As described above, in order to allow the interlocked operation of the protection IC 130 with the secondary battery monitoring IC 120, the protection. IC 130 is provided with the delay time included in the operating time up to the shutdown of the voltage regulator 131 for the secondary battery monitoring IC 120, and it is possible to certainly store the information indicating the detection of the battery overdischarge into the secondary battery monitoring IC 120.

Figure 8:
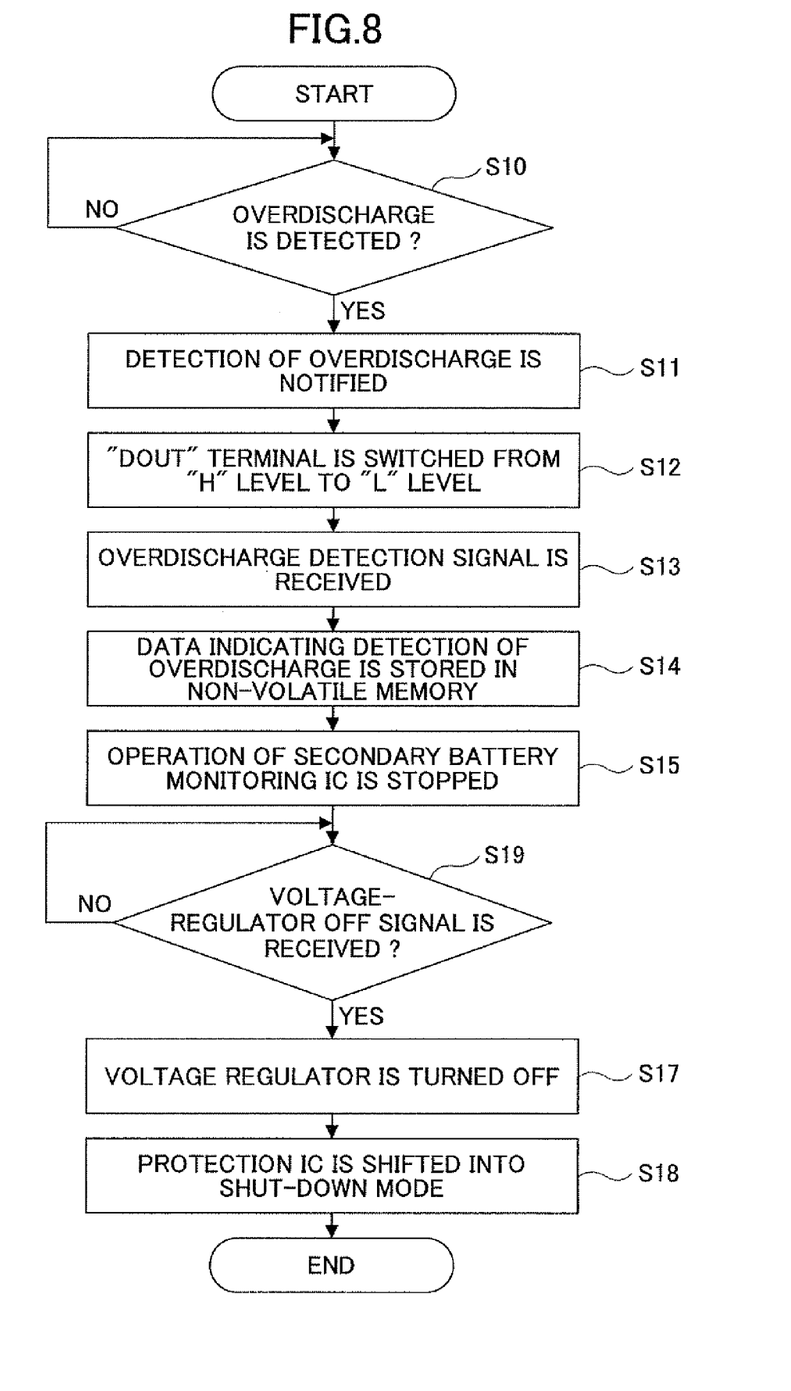
FIG. 8 is a flowchart for explaining a modification of the operation process of the protection IC and the secondary battery monitoring IC when overdischarge of the battery is detected by the protection IC.

Next, with reference to FIG. 8, a modification of the operation process of the protection IC 130 and the secondary battery monitoring IC 120 of this embodiment when overdischarge of the secondary battery is detected by the protection IC 130 will be described. FIG. 8 is a flowchart for explaining a modification of the operation process of the protection IC and the secondary battery monitoring IC of this embodiment at the time of detection of the battery overdischarge by the protection IC. In the operation process in FIG. 8, the steps which are essentially the same as corresponding steps of the operation process in FIG. 7 are designated by the same reference numerals, and a description thereof will be omitted.

In the modification of the operation process of FIG. 8, step S19 is performed instead of the step S16 in the above-described operation process of FIG. 7.

Specifically, after the step S15 in the operation process of FIG. 8 is performed, the secondary battery monitoring IC 120 generates a voltage-regulator OFF signal for turning off the voltage regulator 131 and outputs the voltage-regulator OFF signal to the protection IC 130.

Subsequently, the protection IC 130 determines whether the voltage-regulator OFF signal is received from the secondary battery monitoring IC 120 (S19).

When it is determined in the step S19 that the voltage regulator OFF signal is received, the protection IC 130 turns off the voltage regulator 131 (S17). When it is determined in the step S19 that the voltage regulator OFF signal is not received, the protection IC 130 continues the counting of clock pulses.

As described above, in the modification, the protection IC 130 determines whether the voltage regulator OFF signal generated by the secondary battery monitoring IC 120 is received, rather than determining whether the predetermined delay time has elapsed by performing the counting of clock pulses from the time of detection of the battery overdischarge.

After it is determined that the voltage regulator OFF signal is received from the secondary battery monitoring IC 120, the protection IC 130 turns off the voltage regulator 131. Accordingly, after the information indicating the detection of the battery overdischarge by the protection IC 130 is certainly stored in the secondary battery monitoring IC 120, it is possible to efficiently turn off the voltage regulator 131 that supplies the power supply voltage to the secondary battery monitoring IC 120.

Next, with reference to FIG. 9, an operation process of the protection IC 130 and the secondary battery monitoring IC 120 of an embodiment of the present disclosure when charging of the secondary battery is restarted after the battery overdischarge is detected by the protection IC 130 will be described.

Figure 9:
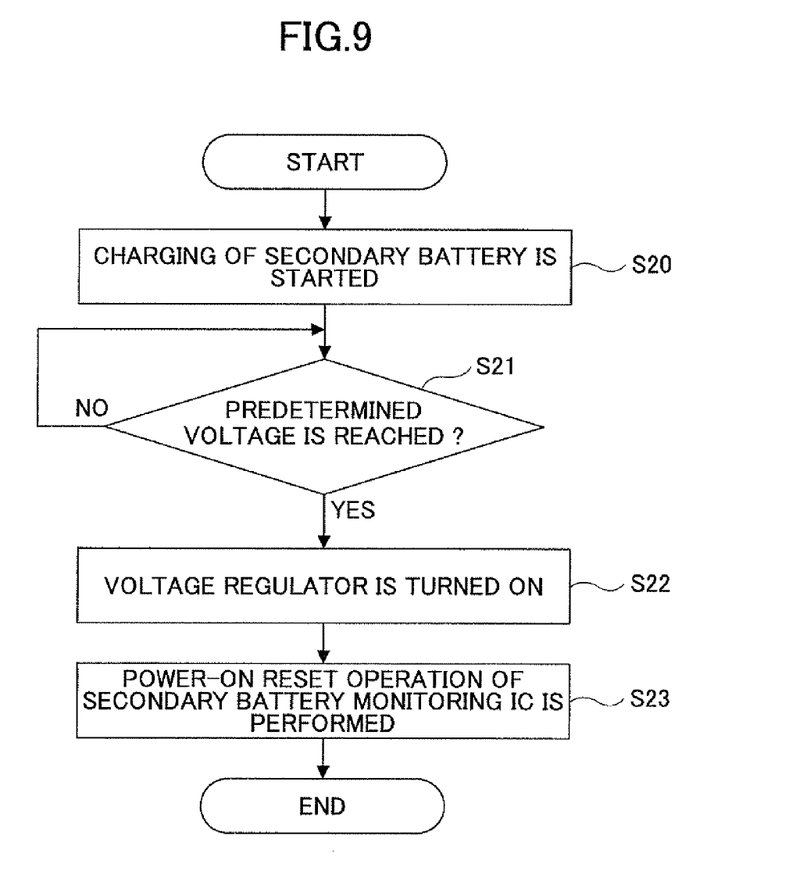
FIG. 9 is a flowchart for explaining an operation process of the protection IC and the secondary battery monitoring IC of an embodiment of the present disclosure when charging of the secondary battery is restarted after overdischarge of the battery is detected by the protection IC.

FIG. 9 is a flowchart for explaining the operation process of the protection IC and the secondary battery monitoring IC of this embodiment when charging of the secondary battery is restarted after the battery overdischarge is detected by the protection IC.

In the operation process of FIG. 9, after overdischarge of the secondary battery is detected by the protection IC 130 and then the protection IC 130 and the secondary battery monitoring IC 120 are turned off, the battery pack 100 is manually connected to a battery charger by a user so that charging of the secondary battery is started (S20).

The protection IC 130 determines whether a predetermined voltage of the secondary battery corresponding to a time of overdischarge recovery after the start of the charging of the secondary battery is reached (S21).

When it is determined in the step S21 that the predetermined voltage is reached, the protection IC 130 turns on the voltage regulator 131 that supplies the power supply voltage to the secondary battery monitoring IC 120 (S22). When it is determined in the step S21 that the predetermined voltage is not reached, the protection IC 130 continues the determination processing.

In connection with the ON state of the voltage regulator 131 in the protection IC 130, the power-on reset operation of the secondary battery monitoring IC 120 is performed (S23).

In the foregoing embodiment, if the voltage regulator is immediately turned on at the time of connection of the battery pack with the battery charger while the battery (power supply) voltage is low (for example, less than about 2 V), there is a possibility that the power-on reset operation of the secondary battery monitoring IC 120 is not performed normally. To eliminate the problem, the voltage regulator 131 is turned on after the power supply voltage of the secondary battery is higher than the overdischarge detection voltage or the overdischarge recovery voltage. Thereby, the protection IC 130 is able to certainly perform the power-on reset operation of the secondary battery monitoring IC 120 at the time of the overdischarge recovery.

Next, with reference to FIG. 10, a battery pack 100 including a protection monitoring circuit 101 of an embodiment of the present disclosure as well as a mobile device 160 in which the battery pack 100 is arranged will be described.

Figure 10:
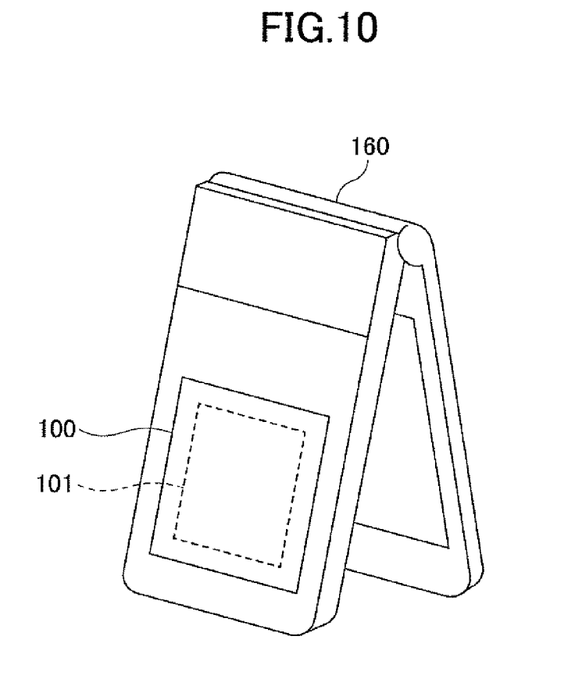
FIG. 10 is a diagram showing an example of a mobile device in which a battery pack including a protection monitoring circuit of an embodiment of the present disclosure is arranged.

FIG. 10 shows an example of a battery pack including the protection monitoring circuit of this embodiment and a mobile device in which the battery pack is arranged.

As shown in FIG. 10, the protection monitoring circuit 101 of this embodiment is contained in the battery pack 100. The battery pack 100 including the protection monitoring circuit 101 is installed in the mobile device 160.

As described above, according to the present disclosure, it is possible to store accurate information indicating the detection of the battery overdischarge into the secondary battery monitoring circuit even when the battery overdischarge is detected and the supply of the power supply voltage to the secondary battery monitoring circuit is inhibited by the protection circuit.

According to the present disclosure, when the protection circuit has operated, the secondary battery monitoring circuit is caused to perform an interrupt process for outputting information indicating that the protection circuit has operated, so that the log information of the protecting operation can be stored in the secondary battery monitoring circuit.

According to the present disclosure, the protection circuit is provided with a delay time contained in the operating time up to the shutdown of the voltage regulator for the secondary battery monitoring circuit, or the protection circuit is provided to perform the process for checking receipt of a voltage regulator OFF signal from the secondary battery monitoring circuit, and it is possible to certainly store the log information indicating the detection of overdischarge of the battery in the secondary battery monitoring circuit.

As described above, the secondary battery monitoring circuit is able to certainly store the log information of the protecting operation by the protection circuit for protecting the secondary battery. Based on the log information of the protecting operation read from the battery pack, the use of the battery pack may be stopped, the charging of the battery pack may be inhibited, or exchange of the battery pack with a new battery pack may be requested of the user of the mobile device.

Therefore, even if a problem of the battery pack, such as bulging or heating, occurs, reading the log information of the protecting operation from the battery pack at a local sales office makes it possible to determine whether the problem of the battery pack is caused by a normal operation or an erroneous operation of the user. In other words, the log information may be used as effective information for testing of the battery pack under fault conditions.

The present disclosure is not limited to the above-described embodiments, and variations and modifications may be made without departing from the scope of the present disclosure.

The present international application is based on and claims the benefit of foreign priority of Japanese patent application No. 2009-006157, filed on Jan. 14, 2009, and Japanese patent application No. 2010-005980, filed on Jan. 14, 2010, the contents of which are incorporated herein by reference in their entirety.

DESCRIPTION OF THE REFERENCE NUMERALS 100 battery pack
101 protection monitoring circuit
111 battery unit
120 secondary battery monitoring IC
121 CPU
130 protection IC
131 voltage regulator (LDO)
132 overcharge detection circuit
133 overdischarge detection circuit
134 overcurrent detection circuit
135 short-circuit detection circuit
136 logic circuit
137 delay circuit
138 communication control circuit
139 level shift circuit
160 mobile device

The invention claimed is:

1. A protection monitoring circuit comprising:
a protection circuit which detects at least one of overcharge, overdischarge, and overcurrent of a chargeable and dischargeable secondary battery and protects the secondary battery by performing an ON/OFF control of transistors; and
a secondary battery monitoring circuit which detects states including a remaining battery level of the secondary battery, said secondary battery monitoring circuit being separate from the protection circuit,
wherein the protection circuit is configured to supply a power supply voltage to the secondary battery monitoring circuit, and further configured to inhibit, if overdischarge of the secondary battery is detected, the supply of the power supply voltage to the secondary battery monitoring circuit after a predetermined time has elapsed or after a control signal for inhibiting the supply of the power supply voltage is received from the secondary battery monitoring circuit, and
wherein the protection circuit outputs a notification signal indicating that overdischarge of the secondary battery is detected, to the secondary battery monitoring circuit if the overdischarge of the secondary battery is detected, and
wherein the protection circuit includes a voltage regulator that supplies the power supply voltage to the secondary battery monitoring circuit.

2. The protection monitoring circuit according to claim 1, wherein the secondary battery monitoring circuit comprises a nonvolatile memory and stores information indicating that the overdischarge of the secondary battery is detected into the nonvolatile memory if the notification signal is received from the protection circuit.

3. The protection monitoring circuit according to claim 2, wherein the secondary battery monitoring circuit is configured to store, if the notification signal is received, information indicating that the overdischarge is detected into the nonvolatile memory by an interrupt process.

4. The protection monitoring circuit according to claim 2, wherein the secondary battery monitoring circuit is configured to stop operation of the secondary battery monitoring circuit after the information indicating that the overdischarge is detected is stored in the nonvolatile memory.

5. The protection monitoring circuit according to claim 2, wherein the secondary battery monitoring circuit is configured to output the control signal to the protection circuit at a time of stopping operation of the secondary battery monitoring circuit after the information indicating that the overdischarge is detected is stored in the nonvolatile memory.

6. The protection monitoring circuit according to claim 1, wherein, when charging of the secondary battery is restarted after the overdischarge is detected by the protection circuit, the protection circuit is configured to supply the power supply voltage to the secondary battery monitoring circuit at a time a value of the power supply voltage of the secondary battery being charged is equal to a predetermined voltage value.

7. The protection monitoring circuit according to claim 1, wherein the predetermined voltage value is lower than a value of the power supply voltage of the secondary battery at which overdischarge of the secondary battery is detected.

8. A battery pack in which the protection monitoring circuit according to claim 1 and the secondary battery are arranged.

* * * * *